United States Patent
Park et al.

(10) Patent No.: US 9,469,742 B2
(45) Date of Patent: Oct. 18, 2016

(54) POLYAMIDE COMPOSITES CONTAINING GRAPHENE

(71) Applicant: BASF SE, Ludwigshafen (DE)

(72) Inventors: Hye Jin Park, Ludwigshafen (DE); Qi Xia, Ludwigshafen (DE); Cecile Schneider, Frankenthal (DE); Philippe Desbois, Edingen-Neckarhausen (DE); Bernd Bruchmann, Freinsheim (DE); Rolf Mülhaupt, Freiburg (DE)

(73) Assignee: BASF SE (DE)

( * ) Notice: Subject to any disclaimer, the term of this patent is extended or adjusted under 35 U.S.C. 154(b) by 258 days.

(21) Appl. No.: 14/178,943

(22) Filed: Feb. 12, 2014

(65) Prior Publication Data

US 2014/0225026 A1 Aug. 14, 2014

Related U.S. Application Data

(60) Provisional application No. 61/763,972, filed on Feb. 13, 2013.

(51) Int. Cl.
| | |
|---|---|
| *C09K 5/00* | (2006.01) |
| *C08K 3/20* | (2006.01) |
| *H01B 1/24* | (2006.01) |
| *C08K 3/04* | (2006.01) |
| *C09K 5/14* | (2006.01) |

(52) U.S. Cl.
CPC . *C08K 3/20* (2013.01); *C08K 3/04* (2013.01); *H01B 1/24* (2013.01); *C08K 2201/011* (2013.01); *C09K 5/14* (2013.01)

(58) Field of Classification Search
CPC ............ C08K 3/00; C08K 3/04; C08K 3/20; H01B 1/24
USPC ......................................................... 252/77
See application file for complete search history.

(56) References Cited

U.S. PATENT DOCUMENTS

| | | | | |
|---|---|---|---|---|
| 6,677,015 B2 * | 1/2004 | Himmelmann | ...... | C08G 73/028 428/35.7 |
| 2007/0072979 A1 * | 3/2007 | Moad | ...... | C08L 23/10 524/445 |
| 2009/0306332 A1 | 12/2009 | Kray et al. | | |
| 2010/0147188 A1 * | 6/2010 | Mamak | ...... | B82Y 30/00 106/31.13 |
| 2010/0176351 A1 * | 7/2010 | Ruoff | ...... | B82Y 30/00 252/510 |
| 2012/0022187 A1 * | 1/2012 | Desbois | ...... | C08L 1/00 524/35 |
| 2012/0187348 A1 * | 7/2012 | Gortz | ...... | C08K 3/04 252/511 |
| 2013/0072613 A1 * | 3/2013 | Miltner | ...... | C08L 71/02 524/377 |

FOREIGN PATENT DOCUMENTS

| | | |
|---|---|---|
| CN | 101928457 A | 12/2010 |
| CN | 102108123 A | 6/2011 |
| CN | 102352035 A | 2/2012 |
| RO | 119948 B1 | 6/2005 |
| WO | WO-2010086176 A1 | 8/2010 |
| WO | WO-2011144321 A1 | 11/2011 |
| WO | WO-2013010211 A1 | 1/2013 |

OTHER PUBLICATIONS

Xu, Zhen, et al., "In Situ Polymerization Approach to Graphene-Reinforced Nylon-6 Composites", Macromolecules, vol. 43, (2010), pp. 6716-6723.
Zhang, Xiaoqing, et al., "Facile Preparation Route for Graphene Oxide Reinforced Polyamide 6 Composites via In Situ Anionic Ring-Opening Polymerization", Journal of Materials Chemistry, vol. 22, (2012), pp. 24081-24091.
European Search Report for EP13155062.6 mailed Jan. 2, 2014.
International Search Report for PCT/EP2014/052736 dated Mar. 31, 2014.

\* cited by examiner

*Primary Examiner* — Jane L Stanley
(74) *Attorney, Agent, or Firm* — Drinker Biddle & Reath LLP

(57) ABSTRACT

The present invention relates to polyamide composites containing graphene, a method for producing them and to their use as or for producing a material with gas barrier and/or electroconductive and/or thermally conductive properties and/or a mechanically reinforced material.

24 Claims, No Drawings

POLYAMIDE COMPOSITES CONTAINING GRAPHENE

CROSS-REFERENCE TO RELATED APPLICATIONS

This application claims the benefit of U.S. Provisional Application 61/763,972, filed Feb. 13, 2013, which is incorporated herein by reference.

The present invention relates to polyamide composites containing graphene, a method for producing them and to their use as or for producing a material with gas barrier and/or electroconductive and/or thermally conductive properties and/or a mechanically reinforced material.

Graphene, a monolayer of carbon atoms arranged in a two-dimensional honeycomb network, shows some very interesting properties, such as an excellent electrical and thermal conductivity, as well as high thermal and chemical stability. Polymer composites containing graphene have improved mechanical and barrier properties. These characteristics make graphene an ideal candidate to combine it with polymers in order to obtain novel materials having a wide range of advantageous properties.

Polyamides comprise the largest family of engineering plastics with a very wide range of applications. Polyamides are often formed into fibers and are used for monofilaments and yarns, but are also used as molded forms or sheets. Characteristically, polyamides are very resistant to wear and abrasion, have good mechanical properties even at elevated temperatures, have low permeability to gases and have good chemical resistance. Among the different polyamides, polyamide 6 (polycaprolactam; PA 6) and polyamide 6.6 (poly-(N,N'-hexamethylene adipic diamide); poly-(hexamethylene adipamide); PA 6.6) are the most prevalent.

WO 2010/086176 relates to a method for producing a conductive polymer composition comprising graphene by contacting graphite oxide with a water-soluble first polymer or a water-soluble or dispersible surfactant, preferably under ultrasonic treatment in order to exfoliate graphite oxide, and then adding a reduction agent to reduce graphite oxide to graphene, mixing the resulting product with an aqueous latex of a second polymer or with a precursor thereof, removing the water and heating the product until the second polymers flows or forms out of its precursor, and forming the product into the desired form. Graphite oxide is reduced in this process before it is contacted with the second polymer or its precursor and using a separate reduction agent.

RO 119948 relates to a method for producing semi-finished, thermally stabilized, graphite-containing polyamide 6 by anionic polymerization of ε-caprolactam. A mixture comprising melted ε-caprolactam, graphite as self-lubricating additive, thermally stabilizing additive containing copper salts and sodium bis(2-methoxy-ethoxy)dicaprolactam aluminate as polymerization catalyst is brought to a temperature of 115 to 150° C. After introducing the co-catalyst selected from toluylen diisocyanate and 4,4'-diphenyl-methane diisocyanate, the formed prepolymer is transferred rapidly into molds heated at a temperature of 130 to 200° C. wherein takes place the polymerization and heat treatment. Conversion of graphite into graphene is not described. Nor is the use of surfactants described.

Z. Xu and C. Gao describe in Macromolecules 2010, 43, 6716-6723 a method for preparing polyamide 6-graphene composites by sonicating a mixture of graphene oxide (obtained by oxidizing graphite and sonicating the obtained product) and caprolactam. After addition of aminocaproic acid, the mixture is heated. During the polycondensation process, graphene oxide is thermally reduced to graphene. Polymerization takes more than 9 hours. The use of surfactants is not described.

CN-A-101928457 relates to a method for producing carbon-based nylon composites in an anionic polymerization reaction by melting caprolactam, adding nano-sized carbon, such as graphite oxide or graphene, to the melt and dispersing it by ultrasonication or milling, heating the mixture to 110 to 150° C., removing water, adding catalyst and co-catalyst and casting the mixture into a mold. The use of surfactants is not described.

CN-A-102108123 relates to a method for producing nylon-6/graphite oxide nanocomposites in an anionic polymerization reaction by dispersing graphite oxide with ultrasonication in a solvent, adding the obtained colloidal suspension to a caprolactam melt, removing the major part of the solvent by distillation under reduced pressure, adding the catalyst, removing the remaining solvent and water by distillation under reduced pressure, adding the activator and casting the mixture into a mold. The use of surfactants is not described.

The polyamides obtained with the prior art methods are not completely satisfactory yet, especially with regard to their mechanical properties.

It was an object of the present invention to provide graphene-containing polyamide composites with a good electrically and/or thermally conductive properties and/or good gas barrier properties and especially with improved mechanical properties, and a method for producing the same. The composites should have a controlled morphology, i.e. graphene should be distributed smoothly and flatly in the polyamide (in contrast to "crinkled" or "crumpled" graphene usually observed in standard processes for incorporating graphene into polymers).

The object is achieved by a method for producing polyamide composites containing graphene, comprising the following steps:

(i) dispersing a graphitic or graphenic material in an aqueous medium to yield an exfoliated material, and optionally removing non-reacted starting material (i.e. not (sufficiently) exfoliated graphitic or graphenic material) from the aqueous mixture;
(ii) mixing at least one lactam monomer with the aqueous mixture obtained in step (i);
(iii) adding at least one non-ionic surfactant to the aqueous mixture obtained in step (ii);
(iv) removing from the aqueous mixture obtained in step (iii) essentially all water contained therein;
(v) heating the mixture obtained in step (iv) to 100 to 200° C.;
(vi) if the water content of the mixture obtained in step (v) is higher than 300 ppm, subjecting the mixture obtained in step (v) to a further drying process to obtain a mixture with a water content of at most 300 ppm;
(vii) heating the mixture obtained in step (v) or (vi) to 100 to 200° C.;
(viii) adding an anionic polymerization activator;
(ix) adding an anionic polymerization catalyst; and
(x) after polymerization is completed, isolating the resulting polyamide composite.

The invention also relates to polyamide composites containing graphene, obtainable by this method.

The remarks made below with respect to method and the composites according to the invention, to the different uses for the composites and to different products containing them apply both on their own as well as, in particular, in any possible combination with each other.

Graphene is a monolayer of carbon atoms arranged in a two-dimensional honeycomb network. "Graphene" in the terms of the present invention is however not restricted to a material consisting exclusively of single-layer graphene (i.e. graphene in the proper sense and according to the IUPAC definition), but, like in many publications and as used by most commercial providers, rather denotes a graphenic bulk material, which is generally a mixture of a single-layer material, a bi-layer material and a material containing 3 to 10 layers and sometimes even up to 20 layers ("few layer graphene"). The ratio of the different materials (single, bi and multiple layers) depends on the production process and provider. In case of the present invention, the material termed "graphene" is characterized by the absence of the graphite peak in the XRD: The degree of exfoliation of the graphene material being related to the layer thickness can be monitored by XRD (X-ray diffraction). The presence of the reflection at 2theta=25 to 30° (with Cu Kα radiation, X-ray wavelength=0.154 nm; the precise value is 26.3°, but often only a broad band instead of a sharp peak is obtained) originates from the layered structure and thus relates to the amount of native graphite. Preferably, the graphene of the invention does not reveal a graphite peak related to the stacking and thus unexfoliated material.

"Graphene" in terms of the present invention is further characterized by a low bulk density of preferably at most 0.2 g/cm$^3$, e.g. from 0.001 to 0.2 g/cm$^3$ or from 0.005 to 0.2 g/cm$^3$, more preferably at most 0.15 g/cm$^3$, e.g. from 0.001 to 0.15 g/cm$^3$ or from 0.005 to 0.15 g/cm$^3$, even more preferably at most 0.1 g/cm$^3$, e.g. from 0.001 to 0.1 g/cm$^3$ or from 0.005 to 0.1 g/cm$^3$, in particular at most 0.05 g/cm$^3$, e.g. from 0.001 to 0.05 g/cm$^3$ or from 0.005 to 0.05 g/cm$^3$, and specifically at most 0.01 g/cm$^3$, e.g. from 0.001 to 0.01 g/cm$^3$ or from 0.005 to 0.01 g/cm$^3$.

"Graphene" in terms of the present invention is moreover characterized by a high BET (Brunauer-Emmett-Teller) surface area. Preferably, the BET area is at least 200 m$^2$/g, e.g. from 200 to 2600 or from 200 to 2000 or from 200 to 1500 m$^2$/g or from 200 to 700 m$^2$/g; more preferably at least 300 m$^2$/g, e.g. from 300 to 2600 or from 300 to 2000 or from 300 to 1500 or from 300 to 700 m$^2$/g.

In step (i), a graphitic or graphenic material is used. This includes all precursor materials from which graphene can be generated by the dispersion treatment in step (i) and, if the graphenic or graphitic starting material is in an oxidized state, by reduction taking place in situ in the heating step (v) and optionally also in step (vii); the reduction agent being the lactam monomer introduced in step (ii). Another reduction agent is not necessary. Suitable graphitic or graphenic starting materials are for example commercially available graphene, finely dispersed graphite or graphite oxide. As graphite oxide is more hydrophilic than graphene or graphite, and steps (i) to (ii) are carried out in an aqueous medium, the graphitic or graphenic starting material used in step (i) is preferably graphite oxide. Another advantage of using graphite oxide rather than commercially available graphene is that commercial graphene usually does not contain a sufficient proportion of monolayer graphene and, in contrast to graphite oxide, can hardly be further exfoliated.

Graphite oxide is preferably prepared from graphite plates according to the Hummers method (William S. Hummers Jr., Richard E. Offerman, Preparation of Graphitic Oxide, J. Am. Chem. Soc., 1958, 80(6), p. 1339).

The graphenic or graphitic material is preferably purified before being used in step (i), e.g. by washing with water and filtration.

The graphenic or graphitic material is dispersed in an aqueous medium, which leads to exfoliation of the graphenic/graphitic material.

Dispersion is preferably carried out by an ultrasonic treatment, high speed mixing or high pressure homogenization. If an oxidized graphenic or graphitic material such as graphite oxide is used, dispersion is more preferably carried out by an ultrasonic treatment. If a non-oxidized graphenic or graphitic material such as graphene or finely dispersed graphite is used, dispersion is preferably carried out by high pressure homogenization. High pressure homogenization is preferably carried out in the presence of a surfactant. Preferably the surfactant is selected from the below-listed non-ionic surfactants.

The exposure required for obtaining an exfoliated material with the layer distribution defined above depends inter alia on the batch size, the structure of the starting material and the introduced energy and can be easily determined, e.g. by simple preliminary tests. For example, in case of ultrasonic treatment, for a batch of 100 g of graphitic/graphenic material, sonication is carried out for 5 minutes to 10 hours, preferably for 20 minutes to 5 hours, more preferably for 30 minutes to 2 hours and especially for 45 minutes to 2 hours if the energy input is from 135 to 350 J.

Sonication can be carried out by any means suitable for ultrasonic treatment. Like all soundwaves, ultrasound causes periodic compression and expansion of the medium; the molecules are forced together and stretched. They form small bubbles which grow and immediately implode again. This phenomenon is known as cavitation. Each imploding bubble emits shockwaves and tiny liquid jets with a speed of about 400 km/h, which act on the immediate environment. Cavitation can be exploited, for example, in order to accelerate chemical reactions and to increase the solubility of products in a particular medium. Step (i) employing ultrasound can be performed, for example, in such a way that the reaction vessel in which the graphenic/graphitic material is charged in an aqueous medium is in an ultrasound bath, and the reaction mixture is exposed to ultrasound. This method is also called bath sonication. Instead of the use of an ultrasound bath, a sonotrode (=device which transmits the ultrasound vibrations generated by a sound transducer to the material to be subjected to ultrasound; also called horn or probe) may be mounted in the reaction vessel in which the graphenic/graphitic material and the aqueous medium are charged. This method is called horn sonication. The latter alternative is possible especially for relatively large batches as well as for continuous processes.

High speed mixing can be carried out with any high speed or high shear mixer known in the art, such as Ultra Turrax, with a suitably fast rotation speed, such as at least 5000 rpm, preferably at least 6000 rpm and in particular at least 7000 rpm.

High pressure homogenization can be carried out by any high pressure homogenizer known in the art, such as Panda 2K NS1001L from GEA Niro Soavi (Italy), with a suitably high pressure, such as at least 1000 bar, preferably at least 1200 bar and in particular at least 1400 bar.

The concentration of the graphenic or graphitic material may vary as long as aggregation is prevented. Suitable concentrations may vary from 0.1 g to 100 g of graphenic or graphitic material, preferably from 0.2 g to 50 g of graphenic or graphitic material, more preferably from 0.5 to 15 g and in particular from 0.5 to 10 g of graphenic or graphitic material per 1 l of aqueous medium.

The aqueous medium may be water or a mixture of water with a water-miscible organic solvent. Suitable water-miscible solvents are the $C_1$-$C_3$-alkanols methanol, ethanol, n-propanol and isopropanol, polyols, such as ethylene glycol, glycerol or propylene glycol, cyclic ethers, such as tetrahydrofuran and dioxin, short-chained ketones, such as acetone and ethylmethylketone, and amides, such as dimethyl formamide. The mixture contains the water-miscible solvents in an amount of preferably from 0.1 to 50% by weight, more preferably 0.5 to 25% by weight and in particular from 1 to 10% by weight, based on the total weight of the water/organic solvent mixture. Preferably, however, the aqueous medium is water.

If exfoliation is not complete (visible as residual agglomerates), material which is not sufficiently exfoliated is removed, e.g. by sedimentation, filtration or ultracentrifugation.

In step (ii), the aqueous mixture of exfoliated material obtained in step (i) is mixed with at least one a lactam monomer.

The choice of the lactam monomer(s) depends on the polyamide to be obtained and can be any of the lactams customarily used in polyamide synthesis. Preferably, the at least one lactam is selected from ε-caprolactam, 2-piperidone, 2-pyrrolidone, caprylolactam, enantholactam, laurolactam and mixtures thereof. In particular, the lactam is ε-caprolactam. In the present invention, ε-caprolactam (as well as compounds derived therefrom, e.g. ε-caprolactamate etc.) is also termed just caprolactam (caprolactamate etc.).

Preferably, the graphitic or graphenic material introduced in step (i) and the at least one lactam monomer introduced in step (ii) are used in a weight ratio of from 1:5 to 1:5000, more preferably of from 1:10 to 1:3000, even more preferably from 1:20 to 1:2000, particularly preferably from 1:40 to 1:1000, in particular from 1:50 to 1:1000, and specifically from 1:80 to 1:1000, e.g. 1:100 to 1:1000. The suitable ratio depends inter alia on the desired use of the graphene-containing composite. For instance, the use in electroconductive or thermally conductive applications requires higher graphene contents, such as 2 to 10% by weight or 2 to 6% by weight of graphene, based on the total weight of the polyamide composite, so that a higher graphitic or graphenic material to lactam ratio is required, while in the application in or as materials with barrier properties, a lower graphene content, such as 0.1 to 2% by weight of graphene, based on the total weight of the polyamide composite, is sufficient, and thus a lower graphitic or graphenic material to lactam ratio is suitable. Moreover, the optimal ratio is also determined by the polymerization technique as a higher graphene starting material content increases the viscosity which may limit some techniques.

The lactam monomer can be introduced in any common form, e.g. as granules, tablets, flakes or powder.

Mixing is preferably carried out in such a way that the at least one lactam dissolves completely in the aqueous medium and the exfoliated material and the at least one lactam are thoroughly mixed. This can be supported, for example, by shaking, stirring (also stirring under high shear forces) and sonication. In a particular embodiment, the mixture is first stirred until the lactam has completely dissolved and then the mixture is subjected to stirring under high shear forces, e.g. with an Ultra Turrax, and/or to a sonication treatment.

Mixing can be carried out by either adding the lactam to the mixture obtained in step (i) or vice versa by adding the mixture obtained in step (i) to the lactam or adding the two components simultaneously to another vessel. In the two latter cases, it is advantageous to provide the lactam dispersed or dissolved in a suitable solvent, such as the above-described aqueous medium used in step (i). For practical reasons, the first variant [adding the lactam to the mixture obtained in step (i)] is preferred.

In step (iii), at least one non-ionic surfactant is added.

It has to be mentioned that steps (ii) and (iii) are principally interchangeable, i.e. the mixture of step (i) can first be mixed with the at least one non-ionic surfactant and then with the at least one lactam, and it is also possible to mix the mixture of step (i) simultaneously with the at least one lactam and the at least one non-ionic surfactant, but is preferred to carry out step (iii) after step (ii).

The at least one non-ionic surfactant used in step (iii) is preferably selected from alcohols, alkylphenols, amines, amides, arylphenols, fatty acids or fatty acid esters alkoxylated with 1 to 100 equivalents of ethylene oxide and/or propylene oxide; and ethylene oxide/propylene oxide copolymers with a number average molecular weight $M_n$ of from 500 to 10000.

The alcohols, alkylphenols, amines, amides, arylphenols, fatty acids or fatty acid esters are preferably alkoxylated with 10 to 100, more preferably 20 to 100, ethylene oxide and/or propylene oxide units, more preferably with 10 to 100, more preferably 20 to 100 ethylene oxide units.

Alcohols alkoxylated with 1 to 100 equivalents of ethylene oxide and/or propylene oxide are for example $C_8$-$C_{24}$-alcohols, such as capryl, 2-ethylhexanol, pelargonic, capric, undecyl, lauryl, tridecyl, myristyl, pentadecyl, cetyl, palmitoleyl, heptadecyl, stearly, isostearyl, elaidyl, oleyl, linoneyl, nonadecyl, arachidyl, heneicosyl, behenyl, lignoceryl alcohol, the positional isomers thereof, such as the oxoalcohol isomers, and mixtures thereof. They are preferably alkoxylated with 10 to 100, more preferably 20 to 100, ethylene oxide and/or propylene oxide units, more preferably with 10 to 100, more preferably 20 to 100 ethylene oxide units. Such alkoxylated alcohols are commercially available, e.g. as the Lutensol® brands of BASF.

Alkylphenols alkoxylated with 1 to 100 equivalents of ethylene oxide and/or propylene oxide are for example phenols substituted with $C_8$-$C_{20}$-alkyl residues. Examples are octylphenol, nonylphenol, decylphenol and the like. They are preferably alkoxylated with 10 to 100, more preferably 20 to 100, ethylene oxide and/or propylene oxide units, more preferably with 10 to 100, more preferably 20 to 100, specifically 25 to 50, ethylene oxide units. Such alkoxylated alkylphenols are commercially available.

Alkoxylated amines are for examples compounds of formula H—(O-A)$_n$-N(R)—(B—O)$_m$—H, where A and B are independently selected from ethylene and propylene, R is an aliphatic residue, e.g. $C_8$-$C_{24}$-alkyl or -alkenyl, and m+n=1 to 100. Commercially available amine surfactants of the above formula are often mixtures rather than single compounds. They include alkoxylated derivatives of "cocoamine" in which the groups R correspond to alkyl groups derived from various fatty acids including myristic, lauric, palmitic and stearic acid. The average number of carbon atoms in R in cocoamine is 12-14. Other examples are alkoxylated derivatives of "oleylamine", where the principal carbon chain of R corresponds to that of oleic acid (18 carbon atoms), and of "tallowamine", where R is mainly a mixture of hexadecyl and octadecyl. Such commercial surfactants are also usually mixtures of molecules having various values of m+n, and surfactants having a low average value of m+n may contain a minor proportion of non-alkoxylated or mono-alkoxylated amines. The preferred alkoxylated derivatives are the ethoxylated derivatives.

Alkoxylated amides are for examples compounds of formula R—CO—N(R)-(A-O)$_n$—H, where R is a linear or branched saturated or unsaturated $C_5$-$C_{25}$-aliphatic group, e.g. derived from a fatty acid, R' is H, methyl or ethyl, A is ethylene or propylene, preferably ethylene, and n is 1-100, preferably 10-100 and more preferably 20-100.

Alkoxylated fatty acids are for examples compounds of formula R—CO—O-(A-$O_n$)—H, where R is a linear or branched saturated or unsaturated $C_5$-$C_{25}$-aliphatic group, e.g. derived from a fatty acid, A is ethylene or propylene, preferably ethylene, and n is 1-100, preferably 10-100 and more preferably 20-100.

Alkoxylated fatty acid esters are diesters or triesters of aliphatic or aromatic dicarboxylic or tricarboxylic acids. They are for example described in U.S. Pat. No. 5,302,377. Suitable aliphatic dicarboxylic acids contain from 2 to 22, preferably from 3 to 8 carbon atoms. Suitable aliphatic tricarboxylic acids contain from 4 to 22, preferably from 4 to 8 carbon atoms. Aromatic dicarboxylic acids suitably contain from 8 to 22, preferably from 8 to 12 carbon atoms, and aromatic tricarboxylic acids from 9 to 22, preferably from 9 to 12 carbon atoms. Examples of suitable aliphatic dicarboxylic acids are malonic acid, succinic acid and maleic acid. An example of a suitable aliphatic tricarboxylic acid is citric acid. Examples for suitable aromatic dicarboxylic acid are phthalic acid, isophthalic acid and terephthalic acid, and for aromatic tricarboxylic acids trimellitic acid. Suitable alcohols to form the esters with the above acids are polyalkoxylated fatty alcohols. The polyalkoxylated fatty alcohols preferably have between about 1 and about 100 moles of the alkoxylating moieties present for each fatty alcohol moiety and are preferably either polyethoxylated, polypropoxylated or both polyethoxylated and polypropoxylated.

Preferably, the at least one non-ionic surfactant used in step (iii) is selected from $C_{10}$-$C_{20}$-alcohols alkoxylated with 20 to 100 equivalents of ethylene oxide; and ethylene oxide/propylene oxide copolymers with a number average molecular weight $M_n$ of from 1000 to 10000 and an ethylene oxide/propylene oxide ratio of from 1:10 to 10:1.

Suitable $C_{10}$-$C_{20}$-alcohols alkoxylated with 20 to 100 equivalents of ethylene oxide are for example fatty alcohols, such as capryl, undecyl, lauryl, tridecyl, myristyl, pentadecyl, cetyl, palmitoleyl or stearyl alcohol, or mixtures thereof, alkoxylated with 20 to 100 equivalents of ethylene oxide. Such alkoxylated alcohols are commercially available, e.g. as the Lutensol® brands of BASF, e.g. Lutensol® AT 25, Lutensol® AT 50, Lutensol® AT 80 or Lutensol® A7N.

Ethylene oxide/propylene oxide copolymers with a number average molecular weight $M_n$ of from 1000 to 10000 and an ethylene oxide/propylene oxide ratio of from 1:10 to 10:1 are commercially available, e.g. as the Pluronic® PE brands of BASF, e.g. PE 3500, PE 6400, PE 6800 and PE 10500.

More preferably, the at least one non-ionic surfactant used in step (iii) is selected from $C_{10}$-$C_{20}$-alcohols alkoxylated with 20 to 100, specifically 25 to 50, equivalents of ethylene oxide.

Preferably, the graphitic or graphenic material introduced in step (i) and the at least one surfactant introduced in step (iii) are used in a weight ratio of from 50:1 to 1:50, more preferably from 20:1 to 1:20, even more preferably from 20:1 to 1:1.2, e.g. from 20:1 to 1:1; particularly preferably from 10:1 to 1:1.2, e.g. from 10:1 to 1:1; in particular from 5:1 to 1:1.2, e.g. from 5:1 to 1:1; and specifically from 3:1 to 1:1.2, e.g. from 3:1 to 1:1 or from 2:1 to 1:1 or about 1:1. The term "about" means to include any error margins, caused, for example by error margins of the scales etc.

In step (iv), water is removed from the obtained reaction mixture. This can be done by any known means, such as distillation, preferably under reduced pressure.

Step (iv) is preferably carried out in an inert atmosphere, e.g. under nitrogen or argon.

In subsequent step (v), the mixture obtained in step (iv) is heated to 100 to 200° C., preferably to 120 to 160° C. In this heat treatment, the graphitic/graphenic material, if it is introduced into step (i) in oxidized form, such as graphite oxide, is reduced. The reduction agent is the lactam. A further reduction agent is not required and thus not used, i.e. the lactam is the only reduction agent present. If the graphitic or graphenic material used in step (i) is not in oxidized form, but is, e.g., commercially available graphene, step (v) can be principally skipped.

Step (v) leads to the formation of graphene, i.e. of a graphenic bulk material, which is a mixture mainly composed of a single-layer material, a bi-layer material and a material containing 3 to 10 layers, preferably a mixture composed of about 10 to 50% by weight of single-layer material, the remaining portion being essentially material with two to ten layers ("few layer graphene").

Step (v) is preferably carried out in an inert atmosphere, e.g. under nitrogen or argon.

In step (vi), the mixture obtained in step (v) (or in step (iv) if step (v) is skipped) is subjected to a further drying process to obtain a mixture with a water content of at most 300 ppm if the water content of the mixture obtained in the prior step is higher than 300 ppm. Preferably, the mixture obtained in step (v) (or in step (iv) if step (v) is skipped) is subjected to a further drying process to obtain a mixture with a water content of at most 100 ppm if the water content of the mixture obtained in the prior step is higher than 100 ppm.

This drying process can be carried out by any means known in the art, such as drying in high vacuum, preferably under heating, and optionally using drying agents, such as $CaCl_2$, $P_2O_5$ or Sicapent.

The water content can be controlled by known analysis methods, such as the Karl Fischer titration method (Angewandte Chemie 1935, 48, 394-396).

If the dried dispersion containing the at least one lactam and the graphene material contains visible large particles, this is preferably subjected to a further sonication treatment at a temperature above the melting point of the used lactam(s). This sonication treatment can also be carried out after step (v) and before step (vi), but it is more advantageous to carry it out after step (iv) because this step might lead to agglomeration of the graphene material.

Before polymerization is initiated, the mixture obtained in step (vi) (or step (v) if the drying process is not required) is heated in step (vii) to 100 to 200° C., preferably to 120 to 160° C. Step (vii) is preferably carried out in an inert atmosphere, e.g. under nitrogen or argon.

If step (vi) is skipped because the water content after step (v) is yet low enough and if heating in step (v) hasn't been interrupted, for example for analysing the water content or for transferring the reaction mixture to another vessel for polymerization, steps (v) and (vii) coincide with each other.

In step (viii), an activator for the anionic polymerization (sometimes also termed co-catalyst or initiator) is added to the mixture. Addition takes preferably place at a temperature at which the mixture is flowable [as a rule above the melting point of the lactam(s) used in step (ii)], preferably at a temperature (of the mixture) of from 100 to 200° C., more preferably from 120 to 160° C.

The term activator also covers precursors for activated N-substituted lactams of the type that, together with the lactam, form an activated lactam in situ. The number of growing chains depends on the amount of activator.

Suitable activators are all compounds known as activators in the activated anionic polymerization for the production of polyamides.

The activators are preferably selected from isocyanates, capped isocyanates, anhydrides, acyl halides, esters, ureas, allophanates and carbodiimides.

Suitable isocyanates are for example aliphatic or alicyclic diisocyanates, such as butylene diisocyanate, hexamethylene diisocyanate, octamethylene diisocyanate, decamethylene diisocyanate, undecamethylene diisocyanate, dodecamethylene diisocyanate, methylenebis(cyclohexyl 4-isocyanate) or isophorone diisocyanate, aromatic diisocyanates, such as tolylene diisocyanate, or methylenebis (phenyl 4-isocyanate), or polyisocyanates (e.g. polyisocyanates derived from hexamethylene diisocyanate; Basonat® HI 100/BASF SE).

In capped isocyanates (also called masked or blocked isocyanates), the isocyanate groups are reacted reversibly to form another functional group that under appropriate conditions can be converted back into the isocyanate group. Capping or blocking the isocyanate groups lowers the very high reactivity of the isocyanates and enables controlled reaction. One example for capping agents is alcohols, preference being given to monoalcohols, such as tert-butanol or monoether glycols, such as 2-methoxyethoxyethanol, which form a urethane group with the capped isocyanate group. The urethane group is generally diblocked when further reactants are mixed with the alcohol-capped isocyanate.

Other reagents for NCO groups ensure thermally reversible blocking of the isocyanate groups at temperatures of in general below 160° C. Such capping agents are described exhaustively for example, in Z. W. Wicks, Prog. Org. Coat. 3 (1975) 73-99 and Prog. Org. Coat. 9 (1981), 3-28, D. A. Wicks and Z. W. Wicks, Prog. Org. Coat. constituent (B) (1999), 148-172 and Prog. Org. Coat. 41 (2001), 1-83, and also in Houben-Weyl, Methoden der Organischen Chemie, Vol. XIV/2, 61 ff., Georg Thieme Verlag, Stuttgart 1963. Capping agents of this kind are preferably selected from lactams, especially ε-caprolactam, phenols, 5-membered nitrogen heteroaromatic compounds, such as imidazoles, e.g. 1H-imidazole or 2-methylimidazole, triazoles, e.g. 1,2, 4-triazole, amd pyrazoles, e.g. 3,5-dimethylpyrazole, dialkyl malonates, e.g. dimethyl or diethyl malonate, acetanilide, ketoximes, such as acetone oxime and butanone oxime, and sulfite.

Suitable anhydrides are for example carboxylic anhydrides, such as acetic anhydride, maleic anhydride, succinic anhydride or phthalic anhydride.

Suitable acyl halides are for example aliphatic or alicyclic diacyl halides, such as butylenedioyl chloride, butylenedioyl bromide, hexamethylenedioyl chloride, hexamethylenedioyl bromide, octamethylenedioyl chloride, octamethylenedioyl bromide, decamethylenedioyl chloride, decamethylenedioyl bromide, dodecamethylenedioyl chloride, dodecamethylenedioyl bromide, 4,4'-methylenebis(cyclohexyloyl chloride), 4,4'-methylenebis(cyclohexyloyl bromide), isophoronedioyl chloride or isophoronedioyl bromide, and aromatic diacyl halides, such as tolylmethylenedioyl chloride, tolylmethylenedioyl bromide, 4,4'-methylenebis(phenyl)acyl chloride or 4,4'-methylenebis(phenyl)acyl bromide.

Suitable ester activators are especially cycloaliphatic esters (lactones), such as γ-butyrolactone, δ-valerolactone and ε-caprolactone.

Suitable urea activators are N,N'-dialkylureas, such as N,N'-dimethylurea, N,N'-diethylurea, N,N'-dipropylurea, N,N'-diisopropylurea, N,N'-di-n-butylurea, N,N'-diisobutylurea, N,N'-di-sec-butylurea, N,N'-di-tert-butylurea, N,N'-dipentylurea, N,N'-dihexylurea, N,N'-diheptylurea, N,N'-dioctylurea, N,N'-didecylurea and N,N'-didodecylurea, N,N,N',N'-tetraalkylureas, such as N,N,N',N'-tetramethylurea and N,N,N',N'-tetraethylurea, aromatic ureas, such as N,N'-diphenylurea, N,N'-dinaphthylurea, N,N'-ditolylurea, N,N'-dibenzylurea, N-methyl-N'-phenylurea, and N-ethyl-N'-phenylurea, cyclic ureas, such as di(tetrahydro-1H-pyrrol-1-yl) methanone, bis(pentamethylene)urea and carbonylbiscaprolactam.

Suitable allophanate activators are for example compounds of the formula HNR—C(O)—NR'—COOR", wherein R and R' are an isocyanate-containing $C_1$-$C_{20}$-alkyl or $C_6$-$C_{20}$-aryl radical and R" is $C_1$-$C_{20}$-alkyl. Such allophanates are described, for example, in US 2009/0306332.

Suitable carbodiimide activators are aliphatic and cycloaliphatic carbodiimides, such as dimethylcarbodiimide, diethylcarbodiimide, diisopropylcarbodiimide, diisobutylcarbodiimide, di-tert-butylcarbodiimide, dioctylcarbodiimide, tert-butylisopropylcarbodiimide, and dicyclohexylcarbodiimide, and aromatic carbodiimides, such as diphenylcarbodiimide, di-β-naphthylcarbodiimide and 2,6-diisopropylphenylenecarbodiimide.

The anionic polymerization activator is preferably selected from diisocyanates and capped diisocyanates, preferably capped with a lactam, and diacyl halides, and more preferably from diisocyanates and capped diisocyanates, preferably capped with a lactam.

Among the above diisocyanates and diacyl halides and their capped derivatives, preference is given to hexamethylene diisocyanate, isophorone diisocyanate, the capped derivatives of the two afore-mentioned diisocanates, preferably capped with a lactam, hexamethylenedioyl bromide, hexamethylenedioyl chloride and mixtures thereof.

More preferably, the activator is selected from hexamethylene diisocyanate, isophorone diisocyanate and the capped derivatives thereof, preferably capped with a lactam.

If the activator is capped with a lactam, the lactam is preferably the one used in step (ii). Specifically, the lactam is ε-caprolactam.

The activator can be introduced in step (viii) in solid form or in form of a solution. In particular, the activator is introduced in step (viii) in a form dissolved in the lactam(s) used in step (ii).

The weight ratio of lactam to activator can vary widely, but is generally from 1:1 to 10 000:1, preferably from 5:1 to 2000:1, particularly preferably from 20:1 to 1000:1.

Specifically, the anionic polymerization activator is hexamethylene diisocyanate capped with the lactam used in step (ii), preferably with ε-caprolactam. Very specifically, the activator is used in form of a solution of caprolactam-capped hexamethylene-1,6-diisocyanate in caprolactam; this is commercially obtainable as Brüggolen® C20 from L. Brüggemann KG, Germany.

After adding the activator, the reaction mixture is mixed, e.g. by stirring or shaking, in order to allow a thorough distribution of the activator in the mixture. Mixing is carried out at a temperature at which the mixture is flowable [as a rule above the melting point of the lactam(s) used in step (ii)], preferably at a temperature (of the mixture) of from 100 to 200° C., more preferably from 120 to 160° C.

In step (ix), a catalyst for anionic polymerization is added. A catalyst for anionic polymerization is a compound which leads to the formation of lactamate anions. Lactamate anions themselves can act as catalyst.

Addition takes preferably place at a temperature at which the mixture is flowable [as a rule above the melting point of the lactam(s) used in step (ii)], preferably at a temperature (of the mixture) of from 100 to 200° C., more preferably from 120 to 160° C.

The catalyst can be introduced in step (ix) in solid form or in form of a solution. In particular, the catalyst is introduced in step (ix) in a form dissolved in the lactam(s) used in step (ii).

The weight ratio of lactam to catalyst can vary widely, but is generally 1:1 to 10 000:1, preferably from 5:1 to 1000:1, particularly preferably from 10:1 to 500:1.

Preferably, the anionic polymerization catalyst added in step (ix) is selected from sodium caprolactamate, potassium caprolactamate, magnesium bromide caprolactamate, magnesium chloride caprolactamate, magnesium biscaprolactamate, sodium hydride, sodium, sodium hydroxide, sodium methanolate, sodium ethanolate, sodium propanolate, sodium butanolate, potassium hydride, potassium, potassium hydroxide, potassium methanolate, potassium ethanolate, potassium propanolate, potassium butanolate and mixtures thereof. More preferably, the anionic polymerization catalyst is selected from sodium caprolactamate and potassium caprolactamate, and is in particular sodium caprolactamate. Specifically, a solution of sodium caprolactamate in caprolactam is used, e.g. Brüggolen® C10 from L Brüggemann KG, Germany, containing 17 to 19% by weight of sodium caprolactamate in caprolactam.

The weight ratio of activator to catalyst is preferably in the range of from 1:20 to 20:1, more preferably 1:10 to 10:1, even more preferably 1:5 to 5:1, in particular 1:4 to 2:1 and specifically 1:3 to 1:1; e.g. about 1:2. The term "about" means to include any error margins, caused, for example by error margins of the scales etc.

Polymerization generally starts upon addition of the catalyst. Polymerization is essentially terminated when viscosity increases so much that the product becomes solid.

Depending on the intended use of the graphene-containing polyamide produced with the method of the invention, polymerization can be carried out in different ways known in the art for activated anionic polymerization for the production of polyamides, e.g. via blow molding, rotomolding, injection molding, reactive injection molding, different casting methods, such as stand casting, continuous casting, rotational casting or centrifugal casting, extrusion, optionally followed by a forming process; application on a substrate and the like.

Steps (viii) and (ix) are principally interchangeable. However, it is preferred that step (viii) is carried out before step (ix).

The invention further relates to a polyamide composite containing graphene, obtainable by the method of the invention.

The method of the invention allows the production of composites containing a variable amount of graphene, including rather high graphene contents which are only limited by the increase in viscosity of the mixture to be polymerized. The use of surfactants in step (iii) significantly reduces the "crinkling" and "crumpling" of graphene usually observed in standard processes for incorporating graphene into polymers. Polyamides in which graphene is distributed smoothly and flatly have better properties than polyamides with a crumpling graphene.

The graphene-containing polyamide composites are thus characterized by good gas barrier properties, a stronger mechanical enhancement of the polymer structure, a better crystallinity, which is related with better mechanical properties, and good electrically and thermally conductive properties.

The invention also relates to the use of the polyamide composite of the invention as or for producing a gas barrier material and/or an electroconductive material and/or a thermally conductive material and/or a mechanically reinforced material; i.e. as or for producing a material which has gas barrier properties and/or is electroconductive and/or thermally conductive and/or is mechanically reinforced.

The gas barrier material is characterized by a significantly reduced permeability for all atmospheric gases, especially oxygen, nitrogen and carbon dioxide, further for water vapour as well as for hydrocarbon vapour, such as the vapour of alkanes, alcohols, such as methanol or ethanol, etc. Especially, the gas barrier material is characterized by a reduced permeability for nitrogen and water vapour.

The invention is now illustrated by the following, non-limiting examples.

EXAMPLES

1 Preparation of Polyamides

Example 1

Graphite oxide (GO) prepared via the Hummers method (William S. Hummers Jr., Richard E. Offerman, Preparation of Graphitic Oxide, J. Am. Chem. Soc., 1958, 80(6), p. 1339) was first purified by washing with deionized water and filtration until the pH was 6 to 7. The graphite oxide dispersion was dried and either 0.2 g or 0.5 g of dried graphite oxide was suspended in 200 ml of deionized water under vigorous stirring for 15 min followed by a sonication treatment in an ultrasonic bath (320 W, 35 kHz, 1 hour). To the resulting graphene oxide dispersion, 188 g of ε-caprolactam tablets were added. The dispersion was stirred until complete dissolution of caprolactam, followed by high speed stirring (Ultra Turrax, 720 rpm, 5 min) and a short sonication treatment (320 W, 35 kHz, 10 min). Then, 0.2 g of one of the surfactants listed in table 1 were first dissolved in 5 ml of water and added slowly to the graphene oxide/caprolactam dispersion.

The dispersion was first heated at 120° C. for 2 hours to evaporate most of the water and then at 140° C. under $N_2$ atmosphere for 1 h in order to solvothermally reduce the graphene oxide. The brown dispersion turned gradually into black upon the heating time. The mixture was then dried under vacuum at 80° C. for 24 h.

Sonication in a water bath for 10 min at 80° C. was followed by rapid heating to 140° C. under nitrogen and under stirring for melting the dried product. First 4 g of the polymerization activator Brüggolen® C20 (ca 17% of ε-caprolactam-capped hexamethylene-1,6-diisocyanate in ε-caprolactam; from L. Brüggemann KG, Germany) was quickly added to the melt, and the mixture was stirred for 30 min to allow the thorough diffusion of the activator into the melt. Then, also at 140° C., 8 g of the catalyst Brüggolen® C10 (17 to 19% by weight of sodium caprolactamate in caprolactam; from L Brüggemann KG, Germany) were quickly added, upon which polymerization started.

After the internal temperature in the reactive mixture fell back to 140° C., the polymer product was de-molded from the reactor which was cooled to room temperature in a water bath.

Comparative Example 1

The above process steps were carried out analogously, however without the addition of surfactants. The polymer obtained from using 0.2 g of GO is termed Comp. 1.1 and from using 0.5 g of GO Comp. 1.2.

Comparative Example 2

For comparison, a polyamide 6 without graphene and surfactant was prepared in analogy to example 1, using the same catalyst and activator and the same amounts of caprolactam, catalyst and activator.

The different polymers resulting from example 1 as well as from comparative examples 1 and 2 are compiled in table 1.

TABLE 1

| Polymer no | Surfactant | Amount of GO used [g] |
|---|---|---|
| Comp. 1.1 | — | 0.2 |
| Comp. 1.2 | — | 0.5 |
| Comp. 2 | — | — |
| 1.1 | Lutensol ® AT 50 [1] | 0.2 |
| 1.2 | Lutensol ® AT 50 [1] | 0.5 |
| 1.3 | Lutensol ® A7N [2] | 0.2 |
| 1.4 | Lutensol ® A7N [2] | 0.5 |

[1] $C_{16}$-$C_{18}$-fatty alcohol alkoxylated with 50 ethylene oxide units; from BASF
[2] $C_{12}$-$C_{14}$-fatty alcohol alkoxylated with 25 ethylene oxide units; from BASF 2. Properties 2.1 Dispersion of Graphene In order to determine the quality of the dispersion of graphene in the polymers and their appearance, samples of the polymers from examples 1.1 and 1.3 as well as from comparative examples Comp. 1.1 were analyzed with optical microscopy, scanning electron microscopy (SEM) and transmission electron microscopy (TEM). Optical microscopy was performed with an Axioplan 2 (Zeiss) with films (thickness=0.12 mm) cut from the polymers. SEM was performed with a Quanta 250 FEG on sample surfaces cut with a diamond knife at −120° C. The TEM investigations were carried out on a LEO 912 Omega (120 kV). For the TEM measurement, ultra thin sections were prepared at −120° C. using a Reichert Ultracut E ultramicrotom with a diamond knife.

Optical microscopy showed that no large graphene agglomerates or defects, such as cracks and voids, were present in the samples prepared from the polymers of examples 1.1 and 1.3. The polymer sample of example 1.3 had a particularly homogenous appearance without any visible particle or matrix phase separation. The sample prepared from the polymer of the comparative example 1, however, clearly showed large agglomerates of graphene.

The SEM images confirmed these observations, revealing large spherical-shaped particles of approximately 5 µm in diameter in the sample prepared from the polymer obtained in the comparative example 1.1. The SEM image of the polymer sample of example 1.1 showed thin and flat sheets with lateral sizes of the sheets of circa 5 µm and a thickness of approximately 20 nm. This reveals that the aspect ratios of the graphene particles were clearly increased thanks to the surfactant treatment. The polymer sample of example 1.3 showed even better exfoliation morphology. Graphene particles could hardly be seen, indicating a very high exfoliation level.

The TEM measurements confirmed the SEM results, revealing heavily crumpled and thick graphene layers in the sample prepared from the polymer obtained in the comparative example 1.1 and distinctly thinner graphene sheets in the polymer samples of examples 1.1 and 1.3.

2.2 Crystallinity

For determining crystallinity of the polymers, the melting behaviors of the composites were determined by DSC (DSC 6200, Seiko Instruments). Under $N_2$ atmosphere, dried polymer specimens of about 10 mg were first heated from room temperature (r.t.) to 250° C. at a heating rate of 10° C. min$^{-1}$. After cooling the samples to r.t., a second scan up to 250° C. was performed at the same heating rate.

The degree of crystallinity ($\chi_c$) was calculated by the in the below equation, where $\Delta H_m$ is the melting enthalpy evaluated from the first heating scan, $\Phi$ is the weight fraction of the graphene in the composites and $\Delta H_{100}$ is the melting enthalpy of fully crystalline PA6 [the $\Delta H_{100}$ of 190 J g$^{-1}$ is taken as an intermediate value from all reported results studied from fully crystalline PA6 (I. Campoy et al., Polymer 1998, 39, 6279)].

$$\chi_c = \frac{\Delta H_m}{(1-\Phi) \cdot \Delta H_{100}}$$

The results are compiled in table 2.

TABLE 2

Melting enthalpy ($\Delta H_m$), degree of crystallinity ($\chi_c$) and temperature maxima ($T_m$) from the prepared samples during first heating scan

| Sample from polymer no. | $\Delta H_m$ (J g$^{-1}$) | $\chi_c$ (%) | $T_m$ in 1$^{st}$ heating scan (° C.) | $T_m$ in 2$^{nd}$ heating scan (° C.) | |
|---|---|---|---|---|---|
| | | | | $T_{m1}$ | $T_{m2}$ |
| Comp. 2 | 96 | 50.5 | 217 | 208 | 216 |
| Comp. 1.1 | 105 | 55.3 | 218 | 213 | 215 |
| Comp. 1.2 | 109 | 59.5 | 222 | 212 | 215 |
| 1.3 | 110 | 57.9 | 216 | 212 | 216 |
| 1.4 | 114 | 60.0 | 217 | 211 | 216 |

In sample of pure PA6 (without graphene and surfactant; comparative example 2), $\Delta H_m$ (96 J g$^{-1}$) and high value of $\chi_c$ (50.6%) were measured. Higher $\Delta H_m$ and therefore higher degrees of crystallinity were given by the composites with graphene. Significantly increased values of $\chi_c$ up to 60% were evaluated from the graphene-reinforced polymers prepared in the presence of surfactants. Without wishing to be bound by theory, it is assumed that graphene particles act as hetero nucleating agents and promote the crystallization of the polymer chains during the casting process.

2.3 Tensile Tests

The Young's modules of the polymers at their dry states were determined. Young's modulus, also known as the tensile modulus or elastic modulus, is a measure of the stiffness of an elastic material and is a quantity used to characterize materials. It is defined as the ratio of the uniaxial stress over the uniaxial strain in the range of stress in which Hooke's law holds. In solid mechanics, the slope of the stress-strain curve at any point is called the tangent modulus. The tangent modulus of the initial, linear portion of a stress-strain curve is called Young's modulus. It can be experimentally determined from the slope of a stress-strain curve created during tensile tests conducted on a sample of the material. In anisotropic materials, Young's modulus may have different values depending on the direction of the applied force with respect to the material's structure.

The tensile tests were performed on a Zwick Z005 testing machine equipped with a 100N force cell according to DIN EN ISO 527-1/2_1B standard directly after drying (80° C. in vacuum oven for 24 h) and after conditioning (50% relative humidity for 1 week). The specimens were cut from the sliced polymer films into stripes with dimensions of 34 mm in length and 5 mm in width. At least 6 specimens were tested for each sample. After clamping the test foil, a load was applied at a rate of 50 mm min$^{-1}$. The results are compiled in table 3 below.

TABLE 3

Tensile properties at dry states

| Sample | Young's modulus (MPa) | Elongation at break (%) |
|---|---|---|
| Comp. 2 | 404.5 | 26.8 |
| Comp. 1.2 | 897.4 | 7.2 |
| 1.2 | 1247.5 | 5.4 |
| 1.4 | 1193.2 | 3.6 |

Polymers 1.2 and 1.4 show higher stiffness than polymer Comp. 1.2 with the same graphene weight fraction. The improvements of stiffness in the surfactant containing samples are presumably related to the exfoliation levels, i.e. the aspect ratios, of the graphene particles. It is known that the higher aspect ratio of filler greatly increases the stress transfer at the interface of additive and polymer matrices. The graphene particles in polymer Comp. 1.2 without surfactant-coating have spherical structure and thus low aspect ratio, in contrast to the surfactant-coated graphene particles in polymers 1.2 and 1.4 appearing as thin sheets and high aspect ratio. Accordingly, significant differences of stiffness were observed.

The invention claimed is:

1. A method for producing polyamide composites containing graphene, comprising the following steps:
   (i) dispersing a graphitic or graphenic material in an aqueous medium to yield an exfoliated material, and optionally removing non-reacted starting material from the aqueous mixture;
   (ii) mixing at least one lactam monomer with the aqueous mixture obtained in step (i);
   (iii) adding at least one non-ionic surfactant to the aqueous mixture obtained in step (ii);
   (iv) removing from the aqueous mixture obtained in step (iii) essentially all water contained therein;
   (v) heating the mixture obtained in step (iv) to 100 to 200° C.;
   (vi) if the water content of the mixture obtained in step (v) is higher than 300 ppm, subjecting the mixture obtained in step (v) to a further drying process to obtain a mixture with a water content of at most 300 ppm;
   (vii) heating the mixture obtained in step (v) or (vi) to 100 to 200° C.;
   (viii) adding an anionic polymerization activator;
   (ix) adding an anionic polymerization catalyst; and
   (x) after polymerization is completed, isolating the resulting polyamide composite;
   where the graphitic or graphenic material used in step (i) and the at least one non-ionic surfactant added in step (iii) are used in a weight ratio of from 20:1 to 1:1.

2. The method as claimed in claim 1, where the graphitic or graphenic material used in step (i) is graphite oxide.

3. The method as claimed in claim 1, where dispersing in step (i) is carried out by a sonication treatment, high speed mixing or high pressure homogenization.

4. The method as claimed in claim 1, where the at least one lactam monomer used in step (ii) is selected from the group consisting of ε-caprolactam, 2-piperidone, 2-pyrrolidone, caprylolactam, enantholactam, laurolactam and mixtures thereof.

5. The method as claimed in claim 4, where the lactam monomer used in step (ii) is ε-caprolactam.

6. The method as claimed in claim 1, where the graphitic or graphenic material and the at least one lactam monomer are used in a weight ratio of from 1:5 to 1:5000.

7. The method as claimed in claim 1, where the graphitic or graphenic material and the at least one lactam monomer are use in a weight ratio of from 1:10 to 1:1000.

8. The method as claimed in claim 1, where the at least one non-ionic surfactant used in step (iii) is selected from the group consisting of alcohols, alkylphenols, amines, amides, arylphenols, fatty acids or fatty acid esters alkoxylated with 1 to 100 equivalents of ethylene oxide and/or propylene oxide; and ethylene oxide/propylene oxide copolymers with a number average molecular weight $M_n$ of from 500 to 10000.

9. The method as claimed in claim 8, where the at least one non-ionic surfactant used in step (iii) is selected from the group consisting of $C_{10}$-$C_{20}$-alcohol alkoxylated with 20 to 100 equivalents of ethylene oxide and ethylene oxide/propylene oxide copolymers with a number average molecular weight $M_n$ of from 1000 to 10000 and an ethylene oxide/propylene oxide ratio of from 1:10 to 10:1.

10. The method as claimed in claim 1, where the graphitic or graphenic material used in step (i) and the at least one non-ionic surfactant added in step (iii) are used in a weight ratio of from 5:1 to 1:1.

11. The method as claimed in claim 10, where the graphitic or graphenic material used in step (i) and the at least one non-ionic surfactant added in step (iii) are used in a weight ratio of from 3:1 to 1:1.

12. The method as claimed in claim 1, where the graphitic or graphenic material used in step (i) and the at least one non-ionic surfactant added in step (iii) are used in a weight ratio of from 5:1 to 1:1.2.

13. The method as claimed in claim 1, where the graphitic or graphenic material used in step (i) and the at least one non-ionic surfactant added in step (iii) are used in a weight ratio of from 3:1 to 1:1.

14. The method as claimed in claim 1, where in step (v) the mixture is heated to 120 to 160° C.

15. The method as claimed in claim 1, where in step (vi) the mixture obtained in step (v) is subjected to a further drying process to obtain a mixture with a water content of at most 100 ppm.

16. The method as claimed in claim 1, where in step (vii) the mixture is heated to 120 to 160° C.

17. The method as claimed in claim 1, where anionic polymerization activator added in step (viii) is selected from the group consisting of isocyanates, capped isocyanates, anhydrides, acyl halides, esters, ureas, allophanates and carbodiimides.

18. The method as claimed in claim 17, where the anionic polymerization activator is selected from diisocyanates, capped diisocyanates, optionally capped with a lactam, and diacyl halides.

19. The method as claimed in claim 18, where the anionic polymerization activator is selected from the group consisting of hexamethylene diisocyanate, isophorone diisocyanate, the capped derivatives of the two last-mentioned diisocyanates, optionally capped with a lactam, hexamethylenedioyl bromide, hexamethylenedioyl chloride and mixtures thereof.

20. The method as claimed in claim 19, where the anionic polymerization activator is hexamethylene diisocyanate capped with the lactam used in step (ii), optionally with ε-caprolactam.

21. A gas barrier material or an electroconductive material or a thermally conductive material or a mechanically reinforced material comprising the polyamide composite as claimed in claim 20.

22. The method as claimed in claim 18, where the anionic polymerization catalyst is selected from sodium caprolactamate and potassium caprolactamate.

23. The method as claimed in claim 1, where the anionic polymerization catalyst added in step (ix) is selected from the group consisting of sodium caprolactamate, potassium caprolactamate, magnesium bromide caprolactamate, magnesium chloride caprolactamate, magnesium biscaprolactamate, sodium hydride, sodium, sodium hydroxide, sodium methanolate, sodium ethanolate, sodium propanolate, sodium butanolate, potassium hydride, potassium, potassium hydroxide, potassium methanolate, potassium ethanolate, potassium propanolate, potassium butanolate and mixtures thereof.

24. Polyamide composite containing graphene, obtained by the method as claimed in claim 1.

* * * * *